United States Patent
Lee et al.

(10) Patent No.: US 8,502,414 B2
(45) Date of Patent: Aug. 6, 2013

(54) POWER SAVING APPARATUS AND POWER SAVING METHOD THEREOF

(75) Inventors: Yu-Lung Lee, Miaoli County (TW); Chun Chuan Chen, Taipei County (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 379 days.

(21) Appl. No.: 12/851,816

(22) Filed: Aug. 6, 2010

(65) Prior Publication Data

US 2011/0304208 A1 Dec. 15, 2011

(30) Foreign Application Priority Data

Jun. 9, 2010 (TW) .............................. 99118726 A (51) Int. Cl.
*H02J 1/00* (2006.01)
*H02J 3/14* (2006.01)

(52) U.S. Cl.
USPC .................... 307/31; 307/34; 307/36; 307/39

(58) Field of Classification Search
USPC ........................................ 307/41–67, 31–39
See application file for complete search history.

(56) References Cited

U.S. PATENT DOCUMENTS

| 7,994,654 B2 * | 8/2011 | Lee et al. | 307/39 |
| 2009/0212939 A1 * | 8/2009 | Richmond | 340/539.11 |

FOREIGN PATENT DOCUMENTS

CN 201503967 U 6/2010

* cited by examiner

*Primary Examiner* — Rexford Barnie
*Assistant Examiner* — Toan Vu
(74) *Attorney, Agent, or Firm* — Rosenberg, Klein & Lee (57) ABSTRACT

A power saving apparatus and power saving method thereof are disclosed. The apparatus includes a power controller and a power outlet, wherein the power controller has a first signal transmission interface, said first signal transmission signal interface is used to detect the operation mode of a host machine by a second signal transmission interface of said host machine, and outputs a controlling signal according to the operation mode of said host machine. The power socket communicates with the power controller and switches the power-on or off according to the control signal. When the host machine is operated in non-working mode, the power socket will turn off the power supplied to the peripheral electrical devices of the host machines, so as to save the power consumption of the peripheral electrical devices of the host machines.

9 Claims, 6 Drawing Sheets

POWER SAVING APPARATUS AND POWER SAVING METHOD THEREOF

BACKGROUND OF THE INVENTION

1. Field of the Invention

The present invention relates to a power saving apparatus; in particular, to a power saving apparatus which is capable of switching the power-on or off of the power socket apparatus according to the signal transmission status of the host machine.

2. Description of Related Art

With the advances in technology, various new types of electrical appliances are introduced and make people's lives more convenient and comfortable. With the increasing number of electrical appliances, the default wall-mounted AC electrical outlets are insufficient to allow such many electrical appliances to be plugged, hence the extension cords (power strips) to extend the length and increase the number of sockets are required.

For example, computers and the peripheral electrical devices thereof are usually connected to one extension cord. The peripheral electrical devices of computer which frequently to be seen include: a printer, a scanner, a wireless base station, a Hi-Fi system and so on or the combination thereof. The extension cords popular in the market are equipped with one or more than one switch to allow the user to turn on or off the power supplied to the socket groups. However, as the extension cord is usually placed under the table or at the foot of the wall, the user must bend down to find the power switch of the extension cord so as to turn off the power supplied to the socket groups of the extension cord, which causes inconvenience to the user. Therefore, when a user shut down his or her computer, it is quite often that he or she will not turn off the power switch on the extension cord; if he or she leaves for a long time, it is quite normal for he or she to forget to turn off the power of the peripheral electrical devices. If this goes for a long time, not only does the electrical device will be damaged due to long-time operation, but also it results in the waste of power.

SUMMARY OF THE INVENTION

The object of the present invention is to provide a power saving apparatus which is capable of controlling the power-on or off of the power socket apparatus according to the signal transmission status of a host machine, so as to solve the problem of excessive power consumption which is existing in the known power socket apparatus due to the incapability of intelligent control of the power-on or off of the controlled socket(s).

The purpose of the present invention is to provide a kind of power saving apparatus integrating a power controller and a power socket, which uses said power controller to control the power-on or off of the power socket.

In order to achieve the aforementioned objects, according to an embodiment of the present invention, a power saving apparatus is provided. Said power saving apparatus is used to save the power consumption of the peripheral electrical devices of the host machine, which includes a power controller and a power socket, wherein the power controller comprising a first signal transmission interface, said first signal transmission interface detects an operation mode of the host machine via a second signal transmission interface of said host machine, said power controller outputs a control signal according to the operation mode of the host machine; said power controller communicates with said power socket and receives the control signal, and then switches the connection or disconnection of the power which is supplied to the peripheral electrical devices of said host machine according to the control signal.

The aforementioned operation mode is a working mode or a non-working mode. When the host machine is operated in working mode, the control signal is a start signal for power supply; when the host machine is operated in non-working mode, the control signal is a stop signal for power supply and in this case the power socket will cut off the power supply of the peripheral electrical devices of the host machine.

Another technical solution of the present invention is to provide a power saving method, which is applied to the power saving apparatus for the saving of power consumption of the peripheral electrical devices of the host machine. The power saving apparatus includes a power controller and a power socket. The power saving methods includes: the power controller uses a first signal transmission interface to communicate with a second signal transmission interface of a host machine so as to detect a operation mode of the host machine; the power controller outputs a control signal to the power socket according to the detection result; the power socket controls the power-on or off of the power socket according to the control signal; and the power socket controls the power-on or off of the peripheral electrical devices of the host machine according to the control signal.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
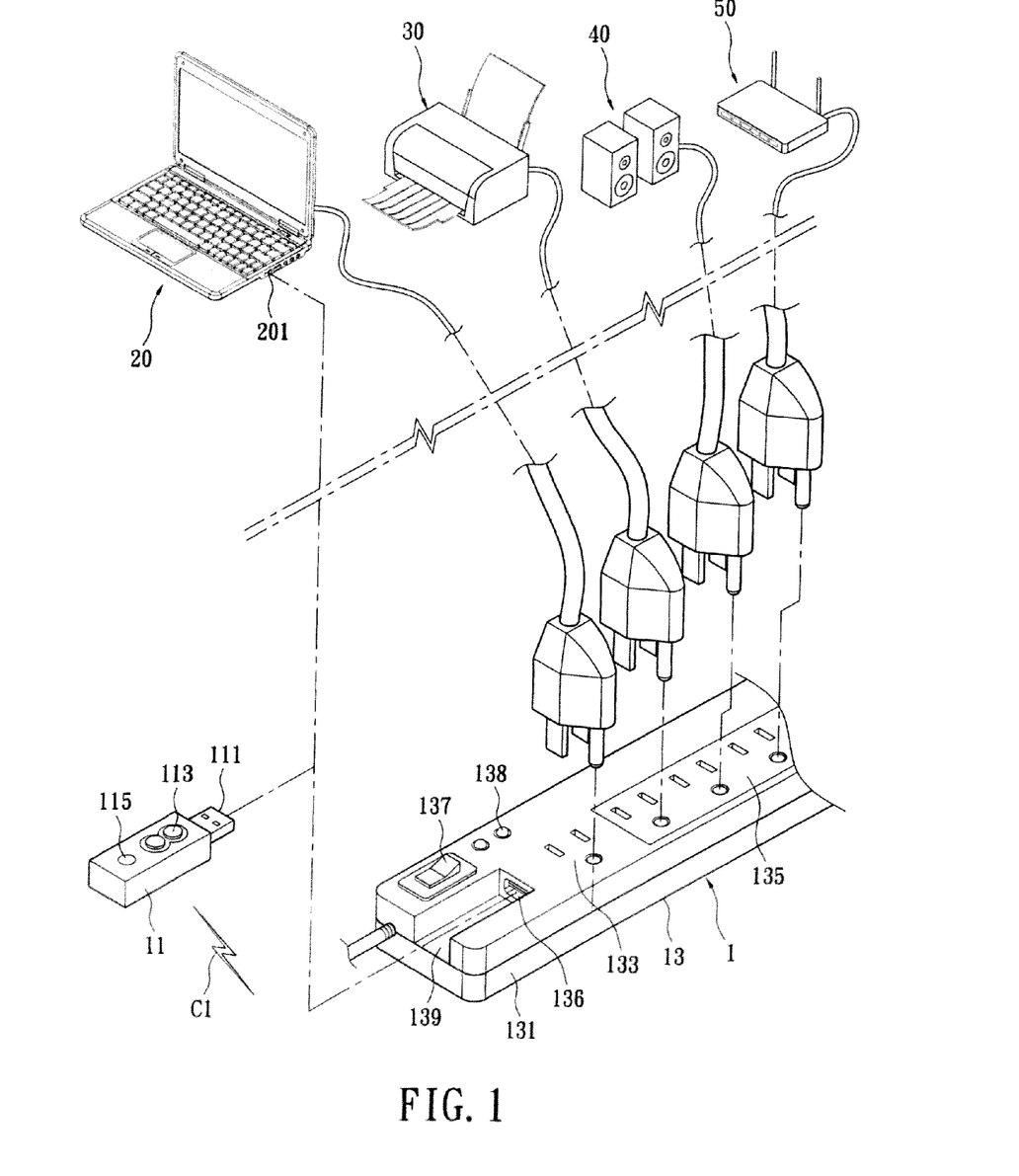
FIG. 1 shows an illustration of power saving apparatus according to an embodiment of the present invention.

Referring to FIG. 1, an illustration of the power saving apparatus according to the first embodiment of the present invention. As shown in FIG. 1, power saving apparatus 1 includes a power controller 11 and a power socket 13, wherein the power controller may choose to be coupled with or separated from power socket 13 so as to undertake the wire or wireless signal transmission. Power socket 13 can allow a host machine 20 and its peripheral electrical devices 30, 40, 50 to be plugged and thereby supplies the power thereto; when the power controller 11 is separated from power socket 13, power controller 11 can be coupled with the host machine 20, power controller 11 controls the switch-on or off of the power socket 13 according to the operation mode of host machine 20, so as to control the power supplied to peripheral electrical devices 30, 40, 50 of the host machine.

For example, host machine 20 may be a desktop or laptop computers (notebook computers) and so on; power socket 13 includes a main body 131, a master socket 133 and at least one controlled socket 135, both master socket 133 and controlled socket 135 are set on the main body, master socket 133 allows host machine 20 to be plugged thereon; controlled socket 135 may be a socket group having one socket or multiple sockets and being controlled by power controller 11, if controlled socket 135 is a socket group having multiple sockets, it may be separately or simultaneously controlled by power controller 11 and allows the peripheral electrical devices 30, 40, 50 of host machine 20 to be plugged thereon, the operations of the peripheral electrical devices 30, 40, 50 are controlled by host machine 20 respectively, the peripheral electrical devices 30, 40, 50 may be any one of printer 30, Hi-Fi system 40 and integrated access device 50, or any combination thereof. Controlled socket 135 may be a single row or dual row socket group, if it is a dual row socket group, one row is always on and the other row may be separately or simultaneously controlled by power controller 11. The user may selectively plug the peripheral electrical devices 30, 40, 50 onto controlled socket 135 depending on the practical need. Power controller 11 may be any of storage device or multimedia AV modules or the combination thereof, such as MP3, flash or any USB dongle. Said power controller 11 has a first signal transmission interface 111, such as USB interface or SATA and like transmission interface. The USB interface including USB 2.0 interface, USB 3.0 interface or Mini USB interface, which is used to detect the operation mode of host machine 20 via a second signal transmission interface 201; the operation mode of host machine 20 may be working mode or non-working mode. The non-working mode referred to in this embodiment shall mean the Hibernation state or the Soft off state of the system power state, which is defined by the Advanced Configuration and Power Interface (ACPI) specification, wherein the hibernation state may be a state for host machine 20 to be continuously idle for a predetermined time period and thereafter automatically enters in, so as to achieve the object of power saving.

Taking a computer system as example, host machine 20 has a power supply unit (not shown) and a mode monitoring unit (not shown). The power supply unit supplies the power not only in the operation mode of host machine 20. Therefore, unless by completely separating or disconnecting the power supply unit and host machine 20, the power supply unit will continuously supply the power to enable the continuous operation of certain system elements. For example, in general computer systems, Embedded Controllers (EC) will continue to receive the standby power from the power supply unit and detect the power supply status of the computer system. In the present invention, an embodiment using the embedded controller as the mode monitoring unit of host machine 20 is provided.

Mode monitoring unit can continuously receive the power supplied from the power supply unit, so as to continuously monitor the power supply status supplied to host machine 20 from the power supply unit. That is, mode monitoring unit can judge the operation mode of host machine 20 by monitoring the current magnitude outputted from power supply unit, and thereby output a mode signal. For example, when the mode monitoring unit detects that the power or voltage level outputted from power supply unit is lower than a preset threshold, the mode monitoring unit judges that host machine 20 is operated in non-working mode and outputs a non-working mode signal; when the mode monitoring unit detects that the power or voltage level outputted from power supply unit is higher than a preset threshold, the mode monitoring unit judges that host machine 20 is operated in working mode and outputs a working mode signal.

In the actual embodiment, the mode monitoring unit has a General Purpose I/O (GPIO), wherein one of the pins of said GPIO may be connected to second signal transmission interface 201, power controller 11 connects to second signal transmission interface via the first signal transmission interface so as to undertake the unidirectional or bidirectional signal transmission. For example, when power controller 11 connects with host machine 20, host machine 20 will first judge the classification of the devices which power controller 11 belongs to by polling, and power controller 11 will also receive the power signal, data signal or command signal from host machine 20. In this way, power controller 11 can receive the mode signal of host machine 20 to detect the operation mode of host machine 20, and host machine 20 can also monitor the power supply status of power socket 13 via power controller 11.

In an embodiment, the power socket 13 further comprises a container housing tank 139, which is used to hold power controller 11, and a third signal transmission interface 136 is installed in container housing tank 139, which is corresponding to first signal transmission interface 111, when first signal transmission interface 111 is the female terminal of a USB interface, third signal transmission interface 136 is the male terminal of USB interface; when first signal transmission interface 111 is the female terminal of a SATA interface, third signal transmission interface 136 is the male terminal of SATA interface, wherein the female terminal and male terminal may be swapped with each other.

The technical features of the present invention lies in using power controller 11 to detect the operation mode of host machine 20. That is, power controller 11 controls the power supplied to peripheral electrical devices 30, 40, 50 of host machine 20 according to the mode signal outputted from host machine 20. In other words, power controller 11 can ensure when host machine 20 is operated in working mode, power socket 13 may supply power to the peripheral electrical devices 30, 40, 50 of host machine 20; and when host machine 20 is operated in non-working mode due to shutdown, idleness or log-out, power socket 13 may stop the supply power to the peripheral electrical devices of host machine 20. More specifically, power controller 11 controls the turn-on or off of the power supply of controlled socket 135 according to the operation mode of host machine 20. When the host machine 20 is operated in non-working mode due to shutdown or sleep, the mode signal outputted from host machine 20 is a non-working mode signal, and when power controller 11 receives the non-working mode signal for a lapse of a specific time, power controller 11 will output a test signal to host machine 20, so as to ensure host machine 20 is operated in non-working mode; when host machine 20 is verified to be operated in non-working mode, power controller 11 outputs a first control signal C1 to power socket 13, in this scenario, said first control signal C1 is stop signal for power supply, which is used to control power socket 13 to stop the power supply of any of the peripheral printer 30, Hi-Fi system 40 or integrated access device 50 of host machine 20 or any combination thereof. In this way, when host machine 20 is operated in non-working mode, the power consumption of the peripheral electrical devices of host machine 20 can be effectively saved.

Power controller 11 can also continuously receive the mode signal of host machine 20 after turn-off of controlled socket 135, and identify the mode signal so as to judge the operation mode of host machine 20; if the mode signal still is non-working mode signal, power controller 11 will not transmit first control signal C1 to power socket 13; if power controller 11 detects that the mode signal is working mode signal, power controller 11 will transmit first control signal C1 to controlled socket 135, in this scenario, the first control signal is start signal for power supply, which is used to control controlled socket 135 to restore the power supply of the peripheral electrical devices 30, 40, 50 of host machine 20.

Power controller 11 further comprises a first operation unit 113, said first operation unit 113 may be a button or a knob, which is used to receive the user's operation command, and switch power controller 11 to be operated in manual mode or in automatic mode according to the operation command. When power controller 11 is operated in manual mode, the user can separate power controller 11 and with host machine 20 controller and use power controller 11 as the manual remote controller to remote-control the turn-on or off of the power supply of power socket 13 within a specific range; when power controller 11 is operated in automatic mode, i.e. power controller 11 is electrically connected to host machine 20, power controller 11 actively controls power-on or off of the power supply of controlled socket 135 according to the operation mode of host machine 20. Power controller 11 further comprises a first command unit 115, said first command unit 115 may be a indicator light to indicate the current electric quantity of power controller 11 or being as low-power warning of power controller 11 by the brightness or number of lights of said indicator light.

Main body 131 of the power socket 13 further comprises a second operation unit 137, said second operation unit 137 may be a button or knob of a power switch, which is used to receive the manual operation to switch the power supply of master socket 133 or controlled socket 135. When controlled socket 135 stops the power supply due to the controls of power controller 11, second operation unit 137 receives the manual operation to force controlled socket 135 to start the power supply. Main body 131 is further equipped with a second indicator unit 138, said second indicator unit may be a indicator light, which is used to indicate the power supply status of controlled socket 135 or surge protection status of power socket 13.

Figure 2:
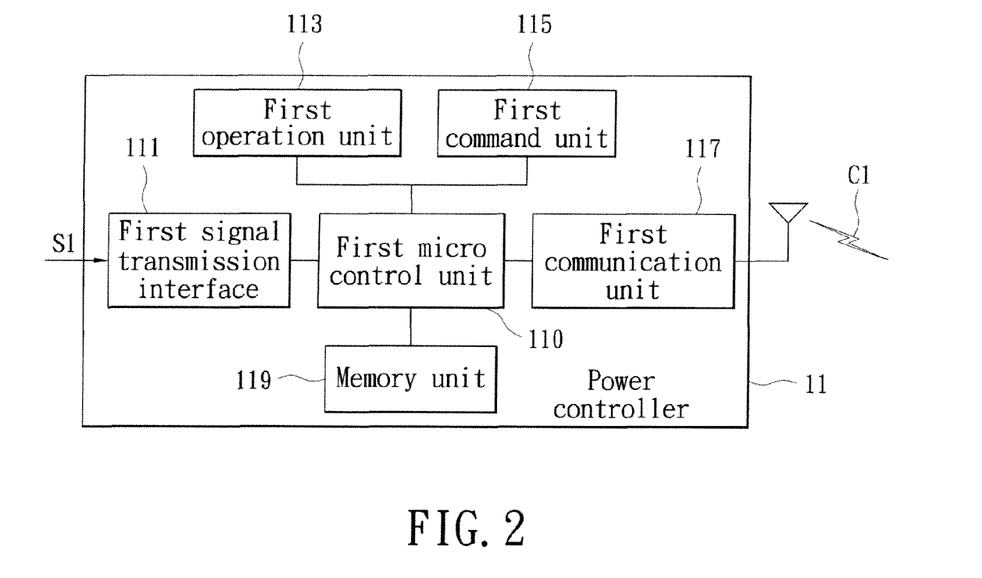
FIG. 2 shows a block diagram illustrating an embodiment of the power controller of the power saving apparatus according to the present invention
Figure 3:
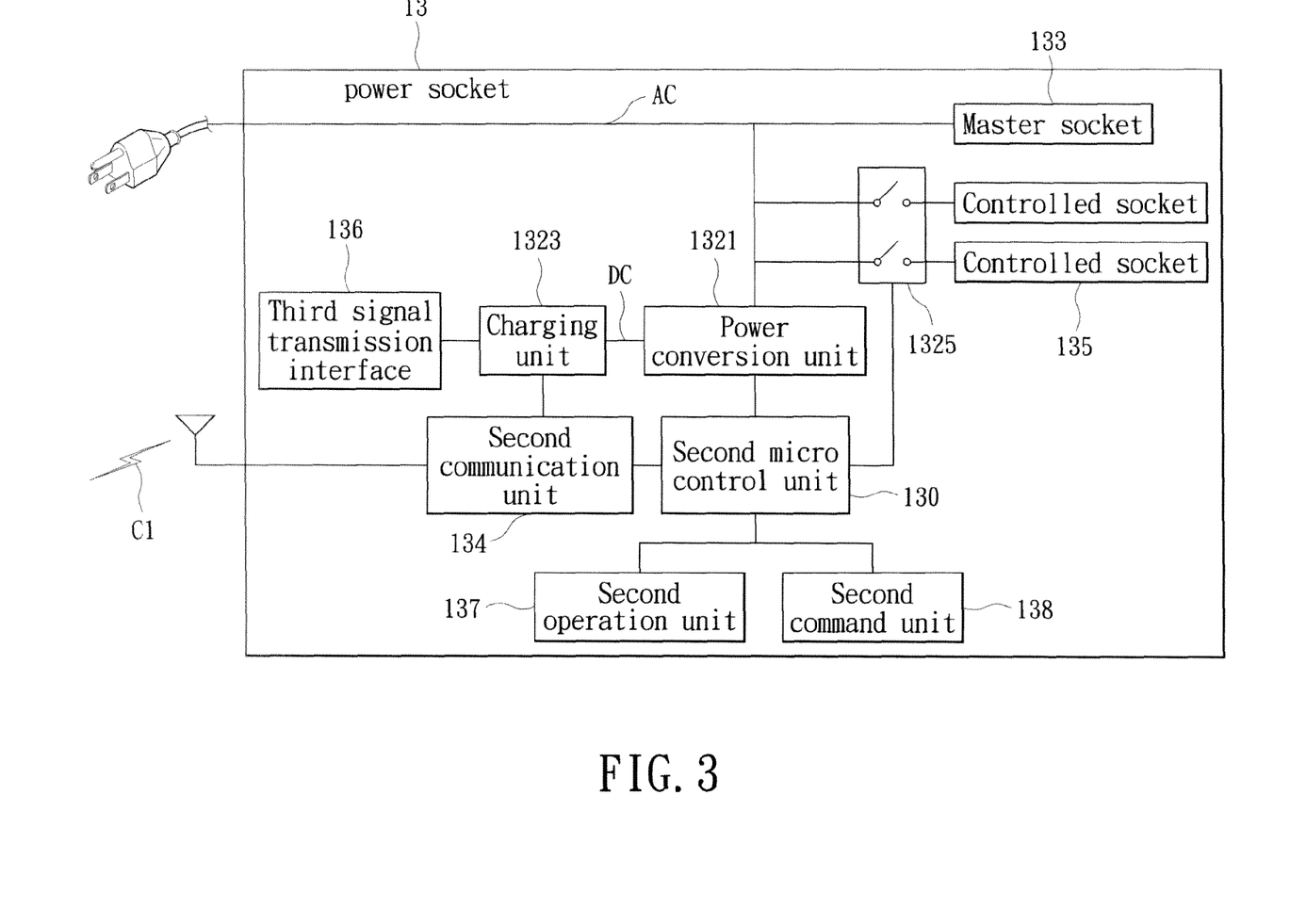
FIG. 3 shows a block diagram illustrating an embodiment of the power socket of the power saving apparatus according to the present invention.

Referring to FIG. 2 and FIG. 3, a description of the elements contained and action principle of power saving apparatus 1 is provided as below.

FIG. 2 is a block diagram illustrating an embodiment of the power controller of the power saving apparatus according to the present invention. As shown in FIG. 2, power controller 11 includes a first micro control unit 110, a first signal transmission interface 111, a first operation unit 113, a first command unit 115, a first communication unit 117 and a memory unit 119. Wherein said first signal transmission unit 111, first operation unit 113, first command unit 115, first communication unit 117 and memory unit 119 are coupled with first micro control unit respectively.

The first signal transmission interface 111 may be a USB interface or other transmission interface. When power controller 11 is coupled with host machine 20, first signal transmission interface 111 receives the mode signal S1 from host machine 20. Mode signal S1 may be the working mode signal or non-working mode signal. First micro control unit 110 generates a first control signal C1 according to mode signal S1. For example, when the mode signal S1 received by first signal transmission interface 111 is working mode signal, the first control signal C1 generated from first micro control unit 110 is a start signal for power supply; when the mode signal S1 received by first signal transmission interface 111 is non-working mode signal, the first control signal C1 generated from first micro control unit 110 is a stop signal for power supply. The first communication unit 117 may be a wireless RF module, a Bluetooth communication module or an infrared communication module. When first micro control unit 110 generates the first control signal C1, first communication unit 117 outputs the first control signal C1 to power socket 13, so as to control the turn-on or off of power supply of power socket 13.

The first micro control unit 110 is further used to judge whether host machine 20 is operated in non-working mode for a lapse of a specific time. When the first micro control unit 110 receives a non-working mode signal, it will generate a test signal in a specific time and transmit said test signal to host machine 20 through the first signal transmission interface 111, host machine 20 will return a mode signal according to test signal, if the mode signal is still non-working mode, first micro control unit 110 will generate a first control signal C1, in this scenario, the first control signal C1 is s stop signal of power supply; if the mode signal returned after the output of test signal is working mode, first micro control unit 110 will generate a first control signal C1, in this scenario, power controller 11 will not output the first control signal C1 and continuously detect the operation mode of host machine 20.

The first micro control unit 110 is further used to switch the operation mode of power controller 11 according to the operation command received by the first operation unit 113, such as manual mode or automatic mode. The memory unit 119 is used to store the software relating to the scheduling programming of the first micro control unit 110.

FIG. 3 is a block diagram illustrating an embodiment of the power socket of the power saving apparatus according to the present invention. As shown in FIG. 3, power socket 13 comprises a second micro control unit 130, a power conversion unit 1321, a second communication unit 134, a switch unit 1325, a second operation unit 137, a second command unit 138, a third signal transmission interface 136, a charging unit 1323, a master socket 133, a controlled socket 135, wherein said power conversion unit 1321, second communication unit 134, second operation unit 137, second command unit 138 are coupled with second micro control unit 130; charging unit 1323 is coupled with third signal transmission interface and power conversion unit 1321 respectively; switch unit 1325 is coupled with second micro control unit 130 and controlled socket 135 respectively; power conversion unit 1321 is coupled with master socket 133 and switch unit 1325 respectively.

Power conversion unit 1321 can converts the alternating current (AC) power into direct current (DC), and output DC power to second micro control unit 130 and charging unit 1323. When power controller 11 is coupled with power socket 13, charging unit 1323 converts the DC power into the charging power and transmits the charging power to the external devices coupled with third signal transmission interface 136 via third signal transmission interface 136. Said external devices may be power controller 11 or other device having the signal transmission interface corresponding to third signal transmission interface 136. Power socket 13 provides the charge power to power controller 11 or other external devices via third signal transmission interface 136, so as to provide the power to power controller 11 required when power controller 11 is separated with host machine 20 and being operated in manual mode. Second micro control unit 130 is further used to control the command from said second command unit 138 according to the surge protection status of power conversion unit 1321.

Second communication unit 134 can communicate with first communication unit 117. Second communications unit 134 is used to receive first control signal C1 and output the power state signal of controlled socket 135. Second micro control unit 130 is used to control the switch of switch unit 1325 according to first control signal C1, so as to control the connection or disconnection with utility power of controlled socket 135 and output the power state signal according to the power supply status of controlled socket 135. For example, when first control signal C1 is a stop signal for power supply, switch unit 1325 is an open circuit; when first control signal C1 is a start signal for power supply, switch unit 1325 is a short circuit. Switch unit 1325 may be a relay or the like switching unit. Second micro control unit 130 also can control the command of second command unit 138 according to the switching condition of switch unit 1325, so as to allow the user to observe the power supply status of controlled socket 135. Second micro control unit 130 can further control the switch of switch unit 1325 according to the operation command receives from second operation unit 137.

Figure 4:
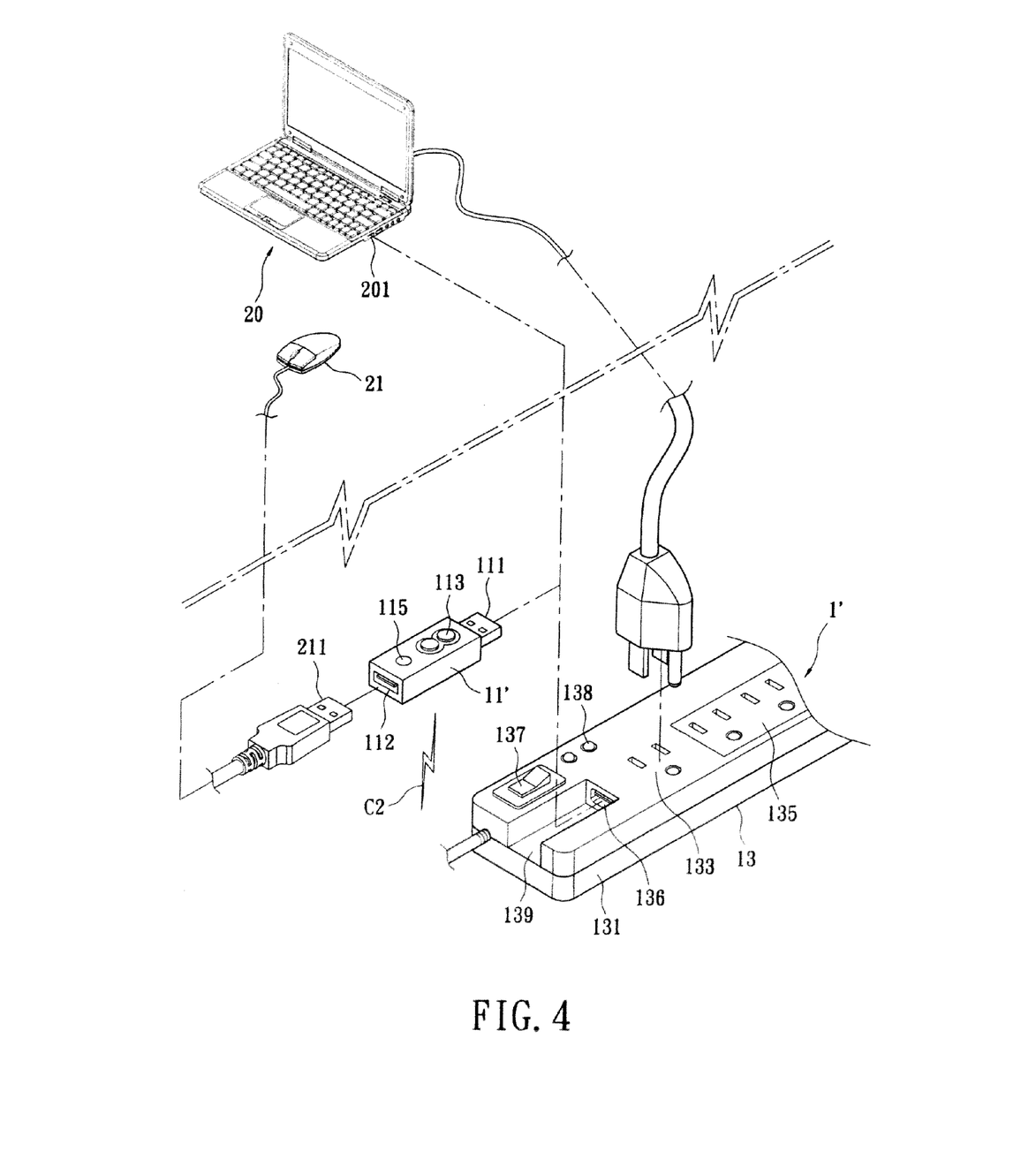
FIG. 4 shows an illustration of power saving apparatus according to another embodiment of the present invention.
Figure 5:
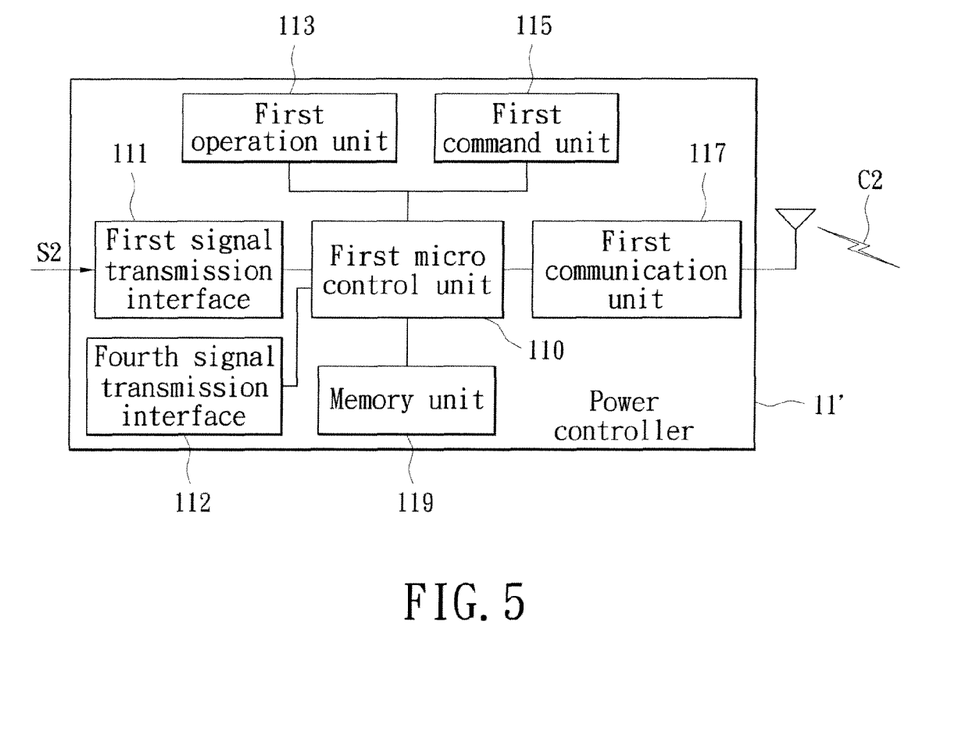
FIG. 5 shows a block diagram illustrating another embodiment of the power controller of the power saving apparatus according to the present invention.

Referring to FIG. 4 and FIG. 5, FIG. 4 is an illustration of the power saving apparatus according to another embodiment according to the present invention.

FIG. 5 is a block diagram illustrating an embodiment of the power controller of the power saving apparatus according to the present invention. As shown in FIG. 4, the difference between power saving apparatus 1' and power saving apparatus 1 in FIG. 1 is that power controller 11' further comprises a fourth signal transmission interface 112, said fourth signal transmission interface 112 can allow a fifth signal transmission interface 211 of an input device, such as mouse or keyboard and the like device to be connected thereto, so as to enable the communication between input device 21 and host machine 20. As shown in FIG. 5, fourth signal transmission interface 112 receives the second signal S2 from input devices 21, said second signal S2 may be a signal of "click" or "drag" and the like command signals; first micro control unit 110 can control the power supply of power socket 13 according to the result whether fourth signal transmission interface 112 receives the second signal. For example, when fourth signal transmission interface 112 receives second signal S2, first micro control unit 110 will output second control signal C2, said second control signal may be a start signal for power supply and which will be transmit to second communication unit 134 via first communication unit 117, and then power socket 13 will control the turn-on or off of the power supply of power socket 13 according to said second control signal C2. In an embodiment, power controller of 11' also can transmit a second signal S2 which coming from input device 21 to host machine 20, so as to serve as the trigger signal for host machine 20 to be switched from non-working mode to working mode; when host machine 20 is switched to working mode, power controller 11' can control the power socket 1' according to the non-working mode signal of host machine 20.

In the actual embodiment, the wireless transmission may be carried out between input device 21 and power controller 11.

Figure 6:
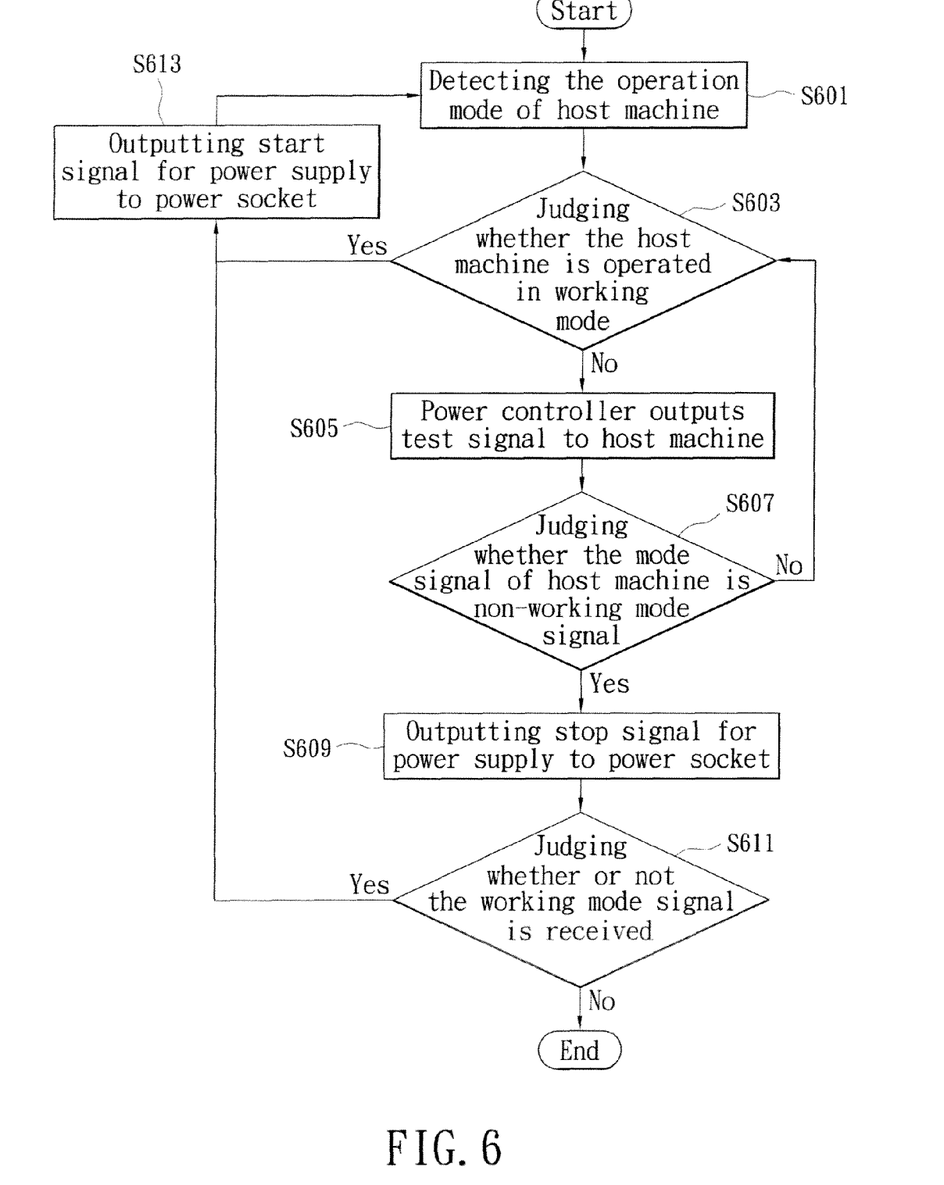
FIG. 6 shows a flow chart illustrating the steps of an embodiment of a power saving method according to the present invention.

Referring to FIG. 6, a flow chart illustrating the steps of an embodiment of a power saving method according to the present invention. As shown in FIG. 6, said power saving method is employed in a power saving apparatuses 1, 1', when power saving apparatuses 1, 1' are coupled with utility power, host machine 20 is coupled with master socket 133, power controllers 11, 11 are coupled with host machine 20, and controlled socket 135 is coupled with the peripheral electric devices (such as printer 30, Hi-Fi system 40, or integration access device 50) of host machine 20, the operation of the peripheral electric devices 30, 40, 50 are controlled by host machine 20. The steps of power saving method comprises: when power controllers 11, 11' are couple with host machine 20, power controllers 11, 11' will detect the operation mode of host machine, wherein the operation mode operating mode is working mode or non-working mode (S601); power controllers 11,11 will judge whether host machine 20 is operated in working mode, that is, host machine 20 will output a working mode signal to power controllers 11, 11' (S603); when power controllers 11, 11' judge that host machine 20 is operated in working mode, power controllers 11,11' will output a start signal for power supply to Power socket 1, 1' (S613), and power controllers 11,11' will continuously detect the operation mode of the host machine 20 (S601).

When power controllers 11, 11' judge that host machine 20 is operated in non-working mode, power controllers 11, 11' output a test signal to host machine 20 after a lapse of a specific time (S605); power controllers 11, 11' judge whether the mode signal outputted from host machine 20 is non-working mode signal (S607); if power controllers 11, 11' judge that the mode signal outputted from host machine 20 is non-working mode signal, power controllers 11, 11' output a first control signal C1 to power socket 13 (S609), in this scenario, the first control signal C1 is a stop signal for power supply, so as to control the cut-off of power supply of controlled socket 135 of power socket 13. If power controllers 11, 11' judge that the mode signal outputted from host machine 20 is a working mode signal, power controllers 11, 11' will not output a first control signal C1 and will return to the judgment whether host machine 20 is operated in working mode (S603).

When the power supply of controlled socket 135 is cut off, power controllers 11, 11' will judge whether they will receive the working mode signal (S611); when power controllers 11, 11' receive the working mode signal, power controllers 11, 11' will output a first control signal C1 to power socket 13, in this scenario, the first control signal C1 is a start signal for power supply, so as to control the restoration of power supply of controlled socket 135 of power socket 13 (S613), and the detection of operation mode of host machine 20 will be continuously proceeded by power controllers 11, 11' (S601).

To summarize the above, the power saving apparatus and the power saving method of the present invention have successfully combined the power sockets and signal transmission device, which use the signal transmission device to detect the signal transmission state of the host machine, so as to control the power-on or off of the power supply of the power socket, thus ensure the host machine to supply power to the peripheral electrical devices thereof only under the condition that the host machine is operated in working state, thereby solve the problem arising from continuous power supply to the peripheral electrical devices of the host machine when the host machine is operated in non-working state.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A power saving apparatus which is used to save the power consumption of the peripheral electrical devices of a host machine, comprising:
    a power controller, which has a first signal transmission interface and a fourth signal transmission interface, said first signal transmission interface detects an operation mode of said host machine by a second signal transmission interface of said host machine, said operation mode is a working mode or a non-working mode, said power controller outputs a first control signal according to the detection result, when said host machine is operated in said working mode, said first signal is a starting signal of power supply, when the host machine is operated in said non-working mode, said first signal is a stop signal of power supply, said power controller further comprising:
- a first micro control unit, said first micro control unit is coupled with said first signal transmission interface and generates said first control signal according to a mode signal outputted from said host machine; and
- a first communication unit, said first communication unit is coupled with said first micro control unit, when said first micro control unit generates said first control signal, said first communication unit outputs said first control signal to said power socket;

wherein said fourth signal transmission interface is coupled with said first micro control unit, said fourth signal transmission interface receives a trigger signal coming from an input device, and said power controller transmits said trigger signal to said host machine, so as to control the switch of operation mode of said host machine from said non-working mode to said working mode; and a power socket, said power socket communicates with said power controller and receives said first control signal, and said power socket controls the power-on or off of said power socket according to said first control signal, when said host machine is operated in said non-working mode, said power socket will turn off the power supplied to the peripheral electrical devices of said host machine.

2. The power saving apparatus according to claim 1, wherein said mode signal is a working mode signal or a non-working mode signal, when said first micro control unit receives said non-working mode signal, said first control signal is a stop signal for power supply, when said first micro control unit receives said working mode signal, said first control signal is a start signal for power supply.

3. The power saving apparatus according to claim 1, wherein said power socket comprising:
- a main body;
- a second communication unit, said communication unit is installed in said main body and which is used to receive said first control signal; and
- a second micro control unit, said second micro control unit is installed in said main body, and said second micro control unit controls a switch unit to turn on or off of the power supply of said power socket.

4. The power saving apparatus according to claim 3, wherein said power socket comprising:
- a power converter; which is coupled with said second micro control unit, and said power converter converts alternating current (AC) power into direct current (DC) power and supplies said direct current (DC) power to said second micro control unit;
- a charging unit, which is coupled with said power converter, said charging unit receives said direct current (DC) power so as to output a charging power; and
- a third signal transmission interface, which is coupled with said charging unit, said third signal transmission interface transmits said charging power.

5. The power saving apparatus according to claim 1, wherein said power controller may be a storage device, a MP3 or a USB dongle; and said first and second signal transmission interfaces may be USB interface or SATA interface.

6. A power saving method of the power saving apparatus, which is used to save the power consumption of the peripheral electrical devices of a host machine, said power saving apparatus comprising a power controller and a power socket, said power controller has a first signal transmission interface and a fourth signal transmission interface, said first signal transmission interface detects an operation mode of said host machine by a second signal transmission interface of said host machine, said operation mode is a working mode or a non-working mode, said power controller outputs a first control signal according to the detection result, when said host machine is operated in said working mode, said first signal is a starting signal of power supply, when the host machine is operated in said non-working mode, said first signal is a stop signal of power supply, said power controller further comprising a first micro control unit and a first communication unit, said first micro control unit is coupled with said first signal transmission interface and generates said first control signal according to a mode signal outputted from said host machine, said first communication unit is coupled with said first micro control unit, when said first micro control unit generates said first control signal, said first communication unit outputs said first control signal to said power socket, wherein said fourth signal transmission interface is coupled with said first micro control unit, said fourth signal transmission interface receives a trigger signal coming from an input device, and said power controller transmits said trigger signal to said host machine, so as to control the switch of operation mode of said host machine from said non-working mode to said working mode, said power saving method comprising:
- said power controller uses a first signal transmission interface to communicate with a second signal transmission interface of a host machine, so as to detect an operation mode of said host machine, said operation mode is a working mode or a non-working mode;
- said power controller outputs a control signal to said power socket according to the detection result, when said host machine is operated in said working mode, said control signal is a start signal for power supply, when said host machine is operated in said non-working mode, said control signal is a stop signal for power supply; and
- said power controller controls the turn-on or off of the power of said power socket which supplied to the peripheral electrical devices of said host machine according to said control signal.

7. The power saving method of the power saving apparatus according to claim 6, further comprising:
- said power controller outputs a test signal to said host machine and receives the reply signal from host machine so as to judge whether said host machine is operated in said non-working mode; and
- when said host machine is operated in said non-working mode, the control signal outputted from said power controller is stop signal for power supply, so as to control the cut-off of power supply of said power socket.

8. The power saving method of the power saving apparatus according to claim 7, further comprising when said host machine is not operated in said non-working mode, said power controller will continue the detection of the operation mode of said host machine.

9. The power saving method of the power saving apparatus according to claim 7, wherein after cut-off of power supply of said power socket further comprising:
- said power controller judges whether the mode signal is said working mode signal; and
- when the mode signal is said working mode signal, the control signal outputted from said power controller is the start signal for power supply, so as to control the power supply of said power socket.

* * * * *